United States Patent [19]

Stall

[11] Patent Number: 5,741,529
[45] Date of Patent: Apr. 21, 1998

[54] ADJUSTABLE REACTION TUBS FOR CELLULOSE

[75] Inventor: Alan D. Stall, Naperville, Ill.

[73] Assignee: Alfacel s.a., Madrid, Spain

[21] Appl. No.: 687,780

[22] Filed: Jul. 31, 1996

[51] Int. Cl.[6] .................................................. A22L 13/00
[52] U.S. Cl. .......................... 425/71; 264/188; 264/196; 264/203; 426/277
[58] Field of Search .................................. 425/68, 67, 71; 264/178 R, 183, 196, 203, 188; 426/277

[56] References Cited

U.S. PATENT DOCUMENTS

| | | |
|---|---|---|
| 1,036,282 | 8/1912 | Lilienfeld . |
| 1,070,776 | 8/1913 | Cohoe et al. . |
| 1,158,400 | 10/1915 | Cohoe . |
| 1,163,740 | 12/1915 | Cohoe . |
| 1,601,686 | 9/1926 | Henderson . |
| 1,612,508 | 12/1926 | Henderson et al. . |
| 1,645,050 | 10/1927 | Henderson . |
| 1,654,253 | 12/1927 | Henderson . |
| 1,887,446 | 11/1932 | Voss . |
| 1,898,400 | 2/1933 | Schnecko et al. . |
| 1,903,622 | 4/1933 | Henderson . |
| 1,937,225 | 11/1933 | Hewitt . |
| 1,958,181 | 5/1934 | Clement . |
| 2,144,899 | 1/1939 | Smith . |
| 2,271,932 | 2/1942 | Atkinson . |
| 2,901,358 | 8/1959 | Underwood et al. . |
| 2,999,756 | 9/1961 | Shiner et al. . |
| 2,999,757 | 9/1961 | Shiner et al. . |
| 3,835,113 | 9/1974 | Burke et al. . |
| 4,164,536 | 8/1979 | Bentley ................................ 425/71 |
| 4,195,054 | 3/1980 | Verellen et al. ...................... 425/71 |
| 4,446,089 | 5/1984 | Strehler et al. ...................... 425/71 |
| 4,590,107 | 5/1986 | Bridgeford ........................... 428/36 |
| 4,778,639 | 10/1988 | Jon et al. ............................. 264/190 |
| 4,790,044 | 12/1988 | Kirchner et al. ...................... 8/151 |
| 5,358,765 | 10/1994 | Markulin ............................. 428/34.8 |
| 5,451,364 | 9/1995 | Ducharme, Jr. et al. ............ 264/559 |

*Primary Examiner*—Jay H. Woo
*Assistant Examiner*—Joseph Leyson
*Attorney, Agent, or Firm*—Marshall, O'Toole, Gerstein, Murray & Borun

[57] ABSTRACT

An adjustable reaction tub for making tubular cellulosic casings from viscose, the tub having upper rollers mounted to a frame and lower rollers on a roll support mounted to the same frame for adjustable positioning of the lower rollers at any of a range of depths within the tub.

5 Claims, 4 Drawing Sheets

ADJUSTABLE REACTION TUBS FOR CELLULOSE

TECHNICAL FIELD

The present invention relates generally to the manufacture of tubular cellulosic casings for food, and more particularly to the tubs used in making regenerated cellulosic casing from extruded viscose (sodium cellulose xanthate, sodium hydroxide, and water).

BACKGROUND ART

The procedure for making regenerated cellulosic casings from extruded viscose is well-known. Viscose is described in U.K. Patent No. 8700 and in U.S. Pat. No. 1,036,282, and its manufacture is described in U.S. Pat. No. 3,835,113. U.S. Pat. Nos. 1,070,776; 1,158,400; and 1,163,740; describe the use of viscose to manufacture a tubular cellulosic casing, and processes for doing so are described in U.S. Pat. Nos. 1,601,686; 1,612,508; 1,645,050; 1,654,253; 2,901,358; and 5,451,364.

The modern process of making regenerated cellulose casings by extruding viscose through an annular die into a bath of coagulating and regenerating liquid held in a reaction tub is described in U.S. Pat. Nos. 1,898,400; 2,271,932; 2,999,756; 2,999,757; 4,590,107. Generally, the casing after extrusion dips into and out of the tub by winding between upper rollers mounted above the tub and lower rollers mounted within the tub, below a liquid level. As explained in U.S. Pat. No. 1,887,446, the casing passes through the air between dips into the liquid, at which time the casing cools and gases are evolved, internally and externally from the casing surfaces. The internal gases are contained within the casing. Conventionally, the casing-making process involves a series of reactions tubs. As explained in U.S. Pat. No. 1,903,622, some tubs contain acid necessary for cellulose regeneration, while others include washwater. Examples of such systems are described in U.S. Pat. Nos. 1,898,400; 1,903,622; 1,937,225; 1,958,181; 2,144,899; 4,778,639; 4,790,044; and 5,358,765.

Conventional systems suffer from several problems.

In conventional systems, hydraulic pressure created by the liquid contents of a tub can cause dimensional distortion of the tub walls on which the lower rollers are mounted. Distortion can be aggravated by thermal expansion of the tub walls caused by high temperatures of the liquid. These distortions tend to skew the alignment and positioning of the lower rollers with respect to the upper rollers. Slight misalignments of the rollers can cause the extruded casing to mis-track at high line-speeds. Thus, in conventional systems, line-speeds are limited to approximately 40 meters per second, much due to poor tracking of adjacent casings.

Conventional systems also offer relatively little flexibility. If the time of submergence in an acid needs to be reduced, for example, the only practical way to achieve a significant reduction in time is to "re-lace" the line to omit a pair (or more) of rollers. Doing so reduces the volume within the casing in which the evolved gases may be contained and distributed, requiring more frequent slitting of the casing to release such gases. Re-placing is also inefficient because it requires each line of casings to be cut and subsequently re-taped.

Because of their positioning within the tank, the lower rollers (which are typically made of glass) are difficult to maintain without breakage. Maintenance is also time-consuming, because it requires the tub to be drained of its liquid in order to provide access to the lower rollers.

SUMMARY OF THE INVENTION

The present invention solves all of these problems, allowing improved alignment of the rollers and, with it, greater line-speeds; fine-tuning of submergence times without any need for re-lacing or any reduction in air residence time; and a simplified maintenance procedure for the lower rollers that does not require draining the tub.

These dramatic improvements are realized by replacing the conventional lower roller mountings within the tank with an adjustable roll support attached to the same frame on which the upper rollers are attached. The roll support can be adjusted by raising it or lowering it with respect to the tank walls, and can even be positioned so that the lower rollers are completely above the liquid level in the tanks, allowing the rollers to be serviced without draining the tank and with minimal risk of damage to the rollers.

DESCRIPTION OF THE PREFERRED EMBODIMENT

Figure 1:
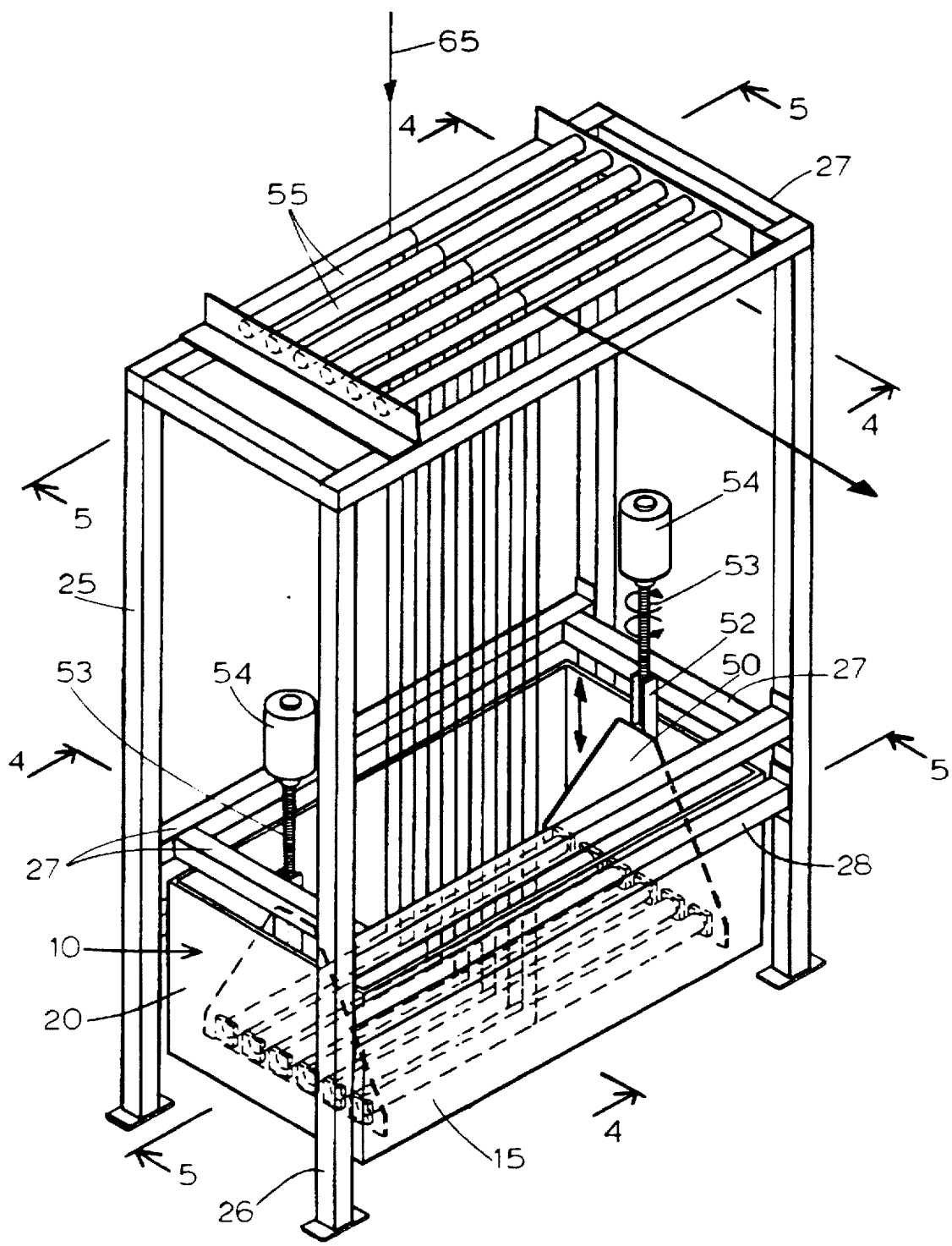
FIG. 1 is a perspective view of an adjustable reaction tub in accordance with the present invention.

Referring to the FIGS., FIG. 1 shows an adjustable reaction tub 10 for use in making regenerated cellulosic casings.

Figure 4:
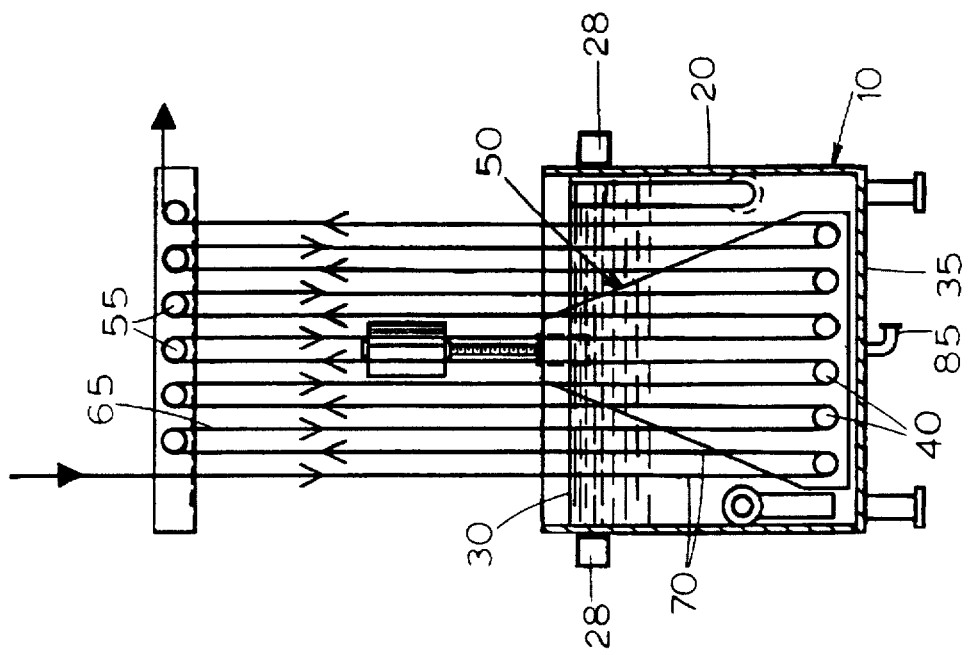
FIG. 4 is a partial, cross-sectional view of the reaction tub of FIG. 1 taken through lines 4—4.

The tub 10 has a series of tank walls 15 and 20 that form a reservoir for acid or washwater. The walls are attached to a tubular frame 25 that includes uprights 26 and crosspieces 27 and 28. In the embodiment illustrated in FIG. 1, the walls are preferably constructed of homopolymer polypropylene and are approximately 105 cm high. The tub is designed to hold liquid up to a liquid level 30 (FIGS. 4 and 5) about 85 to 95 cm above the bottom 35 of the tub. Because some of the cross pieces 28 support the walls when they deflect under the pressure of the liquid in the tub (see FIG. 4), the walls need be only approximately 4 cm thick. Thus, the proportional thickness of the tub walls to their height to the liquid level is approximately 1:22. The tank walls 15 and 20 are thus proportionally thinner than in conventional plastic tubs, and thus less expensive. Alternatively, the walls could be made of other non-metallic materials, such as PVC, PRC, or fiberglass; or of rubber-lined steel, or other anti-corrosive materials, with similar reductions in required thickness.

While the deflection of the thin walls 15 and 20 would cause problems in the alignment of lower and upper rollers in a conventional tub, it causes no problem in the illustrated tub 10 because the lower rollers are not mounted to the tub walls.

Figure 2:
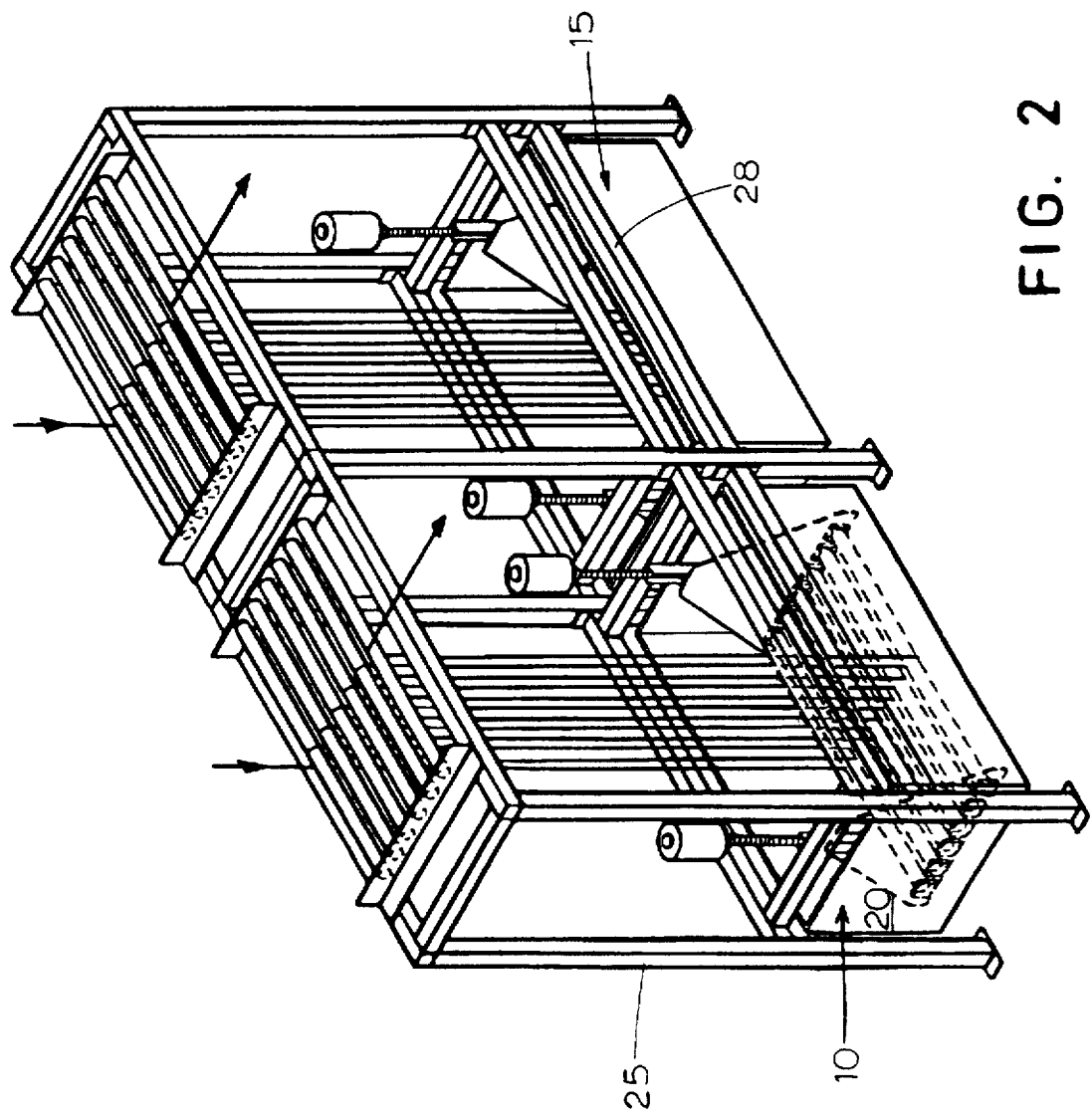
FIG. 2 is a perspective view of a pair of reaction tubs on a common frame.
Figure 3:
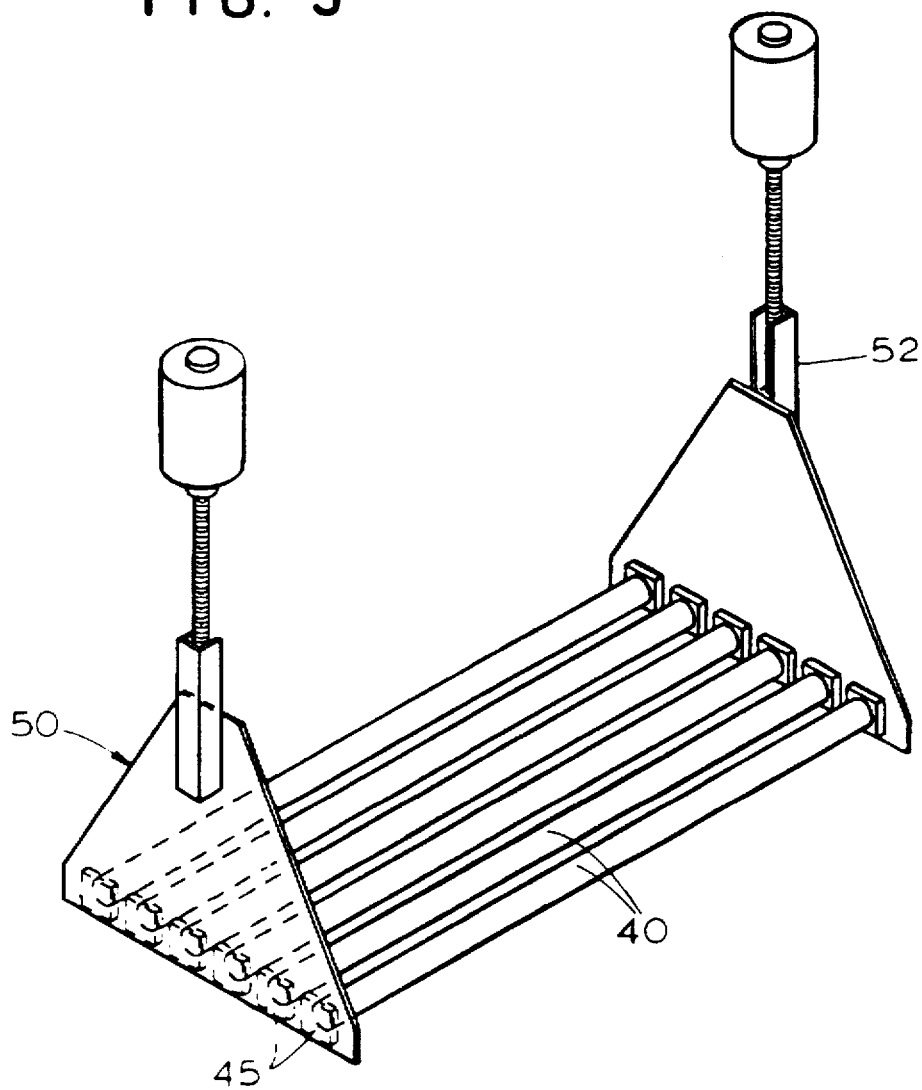
FIG. 3 is an enlarged, perspective view of the roll support of FIGS. 1 and 2.
Figure 5:
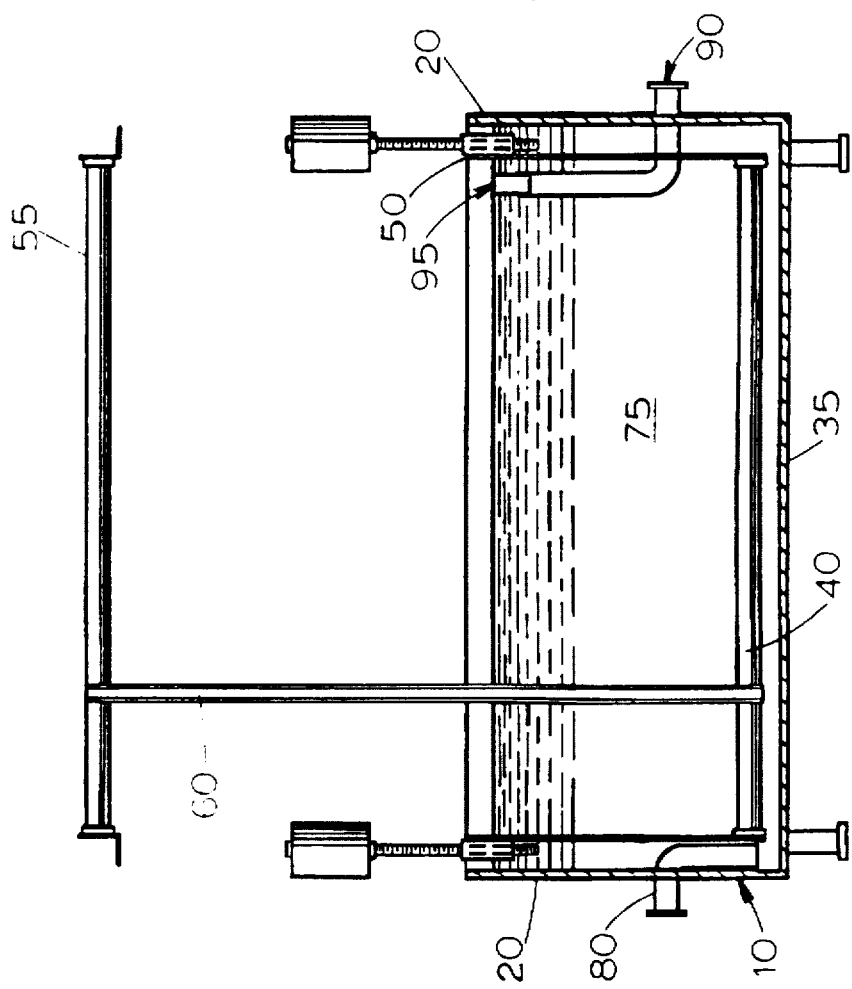
FIG. 5 is a partial, cross-sectional view of the reaction tub of FIG. 1 taken through lines 5—5.

In the embodiment shown in FIG. 2, the long walls 15 of the tub 10 are approximately 508 cm long, accommodating two end-m-end racks of lower rollers 40 (FIGS. 3 and 5). The lower rollers are preferably made of glass. Preferably, each roller is approximately 3" in diameter and 468 cm in length. The rollers are arranged side-by-side on a horizontal plane, with each roller positioned approximately six inches on center from each adjacent roller. The short walls 20 of the tub 10 are approximately 200 cm wide, accommodating six lower rollers arranged side-by-side. The lower rollers do not rotate; they are fixed.

As seen in FIG. 3, lower roller brackets 45 accommodate ends of each of the lower rollers 40. The lower roller brackets are mounted to a roll support 50. As illustrated in FIG. 1, the roll support has a collar 52 that is slotted to one of the cross-pieces 27 of the frame 25 for adjustable positioning of the lower roller brackets at various horizontal planes within the walls 15 and 20 of the tub 10. The lower roller brackets are preferably locked into position by horizontal locking pins (not shown) that lock into pre-drilled holes in the frame 25. The roll support is raised and lowered with respect to the frame by a pair of screw shafts 53 powered by electric motors 54. Alternatively, the roll support could be lifted by, for example, an overhead crane, winches, ratchets, air cylinders, or hydraulic cylinders.

A set of upper rollers 55 is mounted at the top of the frame 25 above the lower rollers 40. The upper rollers preferably are of the same general dimensions as the lower rollers, but are covered with a rubber outer surface. As is conventionally known, the upper rollers rotate about their axis, and are driven by motors. The upper rollers are positioned on a horizontal plane, parallel with the lower rollers.

Casing 60 (best seen in FIG. 5) winds in a path 65 (FIGS. 1 and 4) between the upper rollers 55 and the lower rollers 40. Submerged portions 70 of the path, below the liquid level 30, are within the liquid 75. By raising the roll support 50, the submerged portions of the path are shortened while the remainder of the path, above the liquid level, remains unchanged. Since casing on the path moves at the same line-speed at all points on the path, adjusting the horizontal positioning of the roll support 50 allows the submergence times of the casing to be adjusted without the need for re-lacing the line or changing the amount of time that the casing is exposed to the air between submerged portions of the path.

By lengthening the screw shafts 53 and mounting the electric motors 54 in a higher position than illustrated in FIG. 1, the tub 10 can be designed so that the roll support 50 can be raised high enough so that the lower rollers 40 are completely above the liquid level 30. Raising the lower rollers above the liquid level allows the lower rollers to be serviced without the need to drain the liquid 75 from the tub 10.

As is conventionally known, liquid can be added to the tub 10 through an inlet 80 (FIG. 5) and drained through a drain 85 (FIG. 4) on the bottom 35 of the tub. An overflow pipe 90 (FIG. 5) includes an insert 95 that can be adjusted to different liquid levels.

Numerous modifications and alternative embodiments of the invention will be apparent to those skilled in the art upon review of this description. Accordingly, this description should be construed as illustrative only and is for the purpose of teaching those skilled in the art the best mode of carrying out the invention. The details of the structure may be varied substantially without departing from the spirit of the invention.

I claim:

1. An adjustable reaction tub for use in making regenerated cellulosic casings, the tub comprising:

tub walls with a liquid level;

a frame extending outside the tub walls;

a set of upper rollers attached to the frame above the liquid level;

a roll support comprising lower rollers, and mounted to the frame for adjustable positioning of all the lower rollers with respect to the upper rollers at any of a range of depths from an upper position above the liquid level to a lower position within the tub walls below the liquid level; and a casing path winding directly between the upper rollers and the lower rollers.

2. The adjustable reaction tub of claim 1 in which:

the tub walls are constructed of a non-metallic material; and the proportion of the thickness of the tub walls to the height of the tub walls to the liquid level is no more than about 1:22.

3. The adjustable reaction tub of claim 2 in which the tub walls are made of homopolymer polypropylene.

4. The adjustable reaction tub of claim 1, in which the lower rollers are arranged side-by-side on a horizontal plane.

5. The adjustable reaction tub of claim 1, in which a horizontal cross-piece on the frame supports the tub walls against deflection under pressure of liquid in the tub.

* * * * *